US006977455B2

(12) United States Patent
Marioni

(10) Patent No.: US 6,977,455 B2
(45) Date of Patent: Dec. 20, 2005

(54) PERMANENT-MAGNET SYNCHRONOUS ELECTRIC MOTOR WITH IMPROVED STATORIC GROUP FOR CIRCULATION PUMPS OF HEATING AND CONDITIONING SYSTEMS

(75) Inventor: Elio Marioni, Dueville (IT)

(73) Assignee: Askoll Holding S.r.l., (IT)

( * ) Notice: Subject to any disclaimer, the term of this patent is extended or adjusted under 35 U.S.C. 154(b) by 0 days.

(21) Appl. No.: 10/754,854

(22) Filed: Jan. 9, 2004

(65) Prior Publication Data
US 2004/0155549 A1 Aug. 12, 2004

(30) Foreign Application Priority Data
Jan. 10, 2003 (EP) .................................. 03425007

(51) Int. Cl.[7] .............................................. H02K 1/00
(52) U.S. Cl. ........................ 310/194; 310/254; 310/71
(58) Field of Search ................................ 310/194, 254, 310/258, 259, 216, 217, 218, 71

(56) References Cited

U.S. PATENT DOCUMENTS

| 4,182,026 | A | * | 1/1980 | Searle ............................ 29/596 |
| 4,818,911 | A | | 4/1989 | Taguchi et al. ............. 310/254 |
| 5,708,406 | A | * | 1/1998 | Tsunoda et al. ............ 335/272 |
| 5,859,486 | A | * | 1/1999 | Nakahara et al. ........... 310/254 |
| 6,066,905 | A | * | 5/2000 | Wright et al. ............... 310/179 |
| 6,144,135 | A | | 11/2000 | Ho ............................. 310/254 |
| 6,452,303 | B1 | | 9/2002 | Marioni ...................... 310/254 |
| 6,566,779 | B2 | * | 5/2003 | Takano et al. .............. 310/214 |

FOREIGN PATENT DOCUMENTS

| FR | 2 273 393 A | 12/1975 |
| FR | 2 810 469 A | 12/2001 |

* cited by examiner

Primary Examiner—Dang Le
(74) Attorney, Agent, or Firm—Akerman Senterfitt

(57) ABSTRACT

A permanent-magnet synchronous electric motor for circulation pumps of heating/conditioning systems of a uniquely simple construction and improved performance. The motor has a motor casing and a cross-like or star-like monolithic body inside the motor casing. The motor further contains a plurality of arms in the cross-like or star-like monolithic body forming the spools of a stator. The stator has a statoric core of laminations and statoric coils wound on respective spools.

18 Claims, 16 Drawing Sheets

PERMANENT-MAGNET SYNCHRONOUS ELECTRIC MOTOR WITH IMPROVED STATORIC GROUP FOR CIRCULATION PUMPS OF HEATING AND CONDITIONING SYSTEMS

FIELD OF THE INVENTION

The present invention relates to a permanent-magnet synchronous electric motor having an improved statoric group for circulation pumps of heating systems, of the type comprising, in a casing of the motor, a stator including a statoric package and statoric coils wound on respective spools.

BACKGROUND OF THE INVENTION

As the skilled ones in the art well know, the fluid circulation pumps arranged in the heating plants or systems are commonly referred to as "circulators".

Current circulators are almost completely supplied with asynchronous motors. Circulators with synchronous motor having permanent-magnet rotor have become commercially successful only recently.

The most popular and cost-efficient synchronous motors only have two stator pole shoes; nevertheless four-pole shoes synchronous motors have been used in modern circulators so as to overcome vibration problems.

For example, a four-pole shoes stator synchronous motor for a circulator is disclosed in U.S. Pat. No. 6,452,303 to the same Applicant.

The stator described in the above-referred patent application is a simple, low-cost construction, each pole piece or pole shoe comprising a combination of a stator coil and respective core of laminations.

The core of laminations are E-shaped pieces cut off from the same metal sheet strip for reducing scraps, and they are overlapped and packed together into statoric group portions that also have an E-shape.

The stator coils are wound around spools by means of automated coil winders, having good return. Each spool includes a pair of connecting pins to which the opposed ends of the conductive wire wound around it are led.

Each spool is fitted on the central part of the E-shaped core of laminations, and the resultant pole shoes are laid adjacent one another to form a ring-like structure which is held together by springs that elastically tie the close ends of the E-shaped portions of the stator group to each other.

Subsequent steps in the motor manufacturing process include tinning and electrical connection of the connecting pins of the spools and their connection to conductive tracks of an electronic board.

While being in several way advantageous, the above assembly procedure is still inadequate for large-volume production methods and extensively automated assembling.

The aim of the present invention is that of providing a permanent-magnet synchronous electric motor, particularly for use with circulation pumps of heating systems, with a uniquely simple construction appropriate to improve the automation of the motor assembly procedures.

SUMMARY OF THE INVENTION

An embodiment of this invention is directed to a permanent-magnet synchronous electric motor for circulation pumps of heating and/or conditioning systems, comprising:

a motor casing;
a cross-like or star-like monolithic body inside said motor casing;
a plurality of arms in said cross-like or star-like monolithic body forming the spools of a stator;
said stator having statoric core of laminations and statoric coils wound on respective spools.

In this manner, the stator coils can be arranged into a unitary whole before the statoric group is assembled, instead of having to assemble the statoric group with separate pre-wound spools, each one individually mounted on respective portions of the statoric group, thus forming the pole shoes that are tied in place by elastic springs.

The features and advantages of the motor of this invention should become apparent from the following description of an embodiment thereof, given by way of significant but non-limiting example with reference to the accompanying drawings.

DETAILED DESCRIPTION

Figure 1:
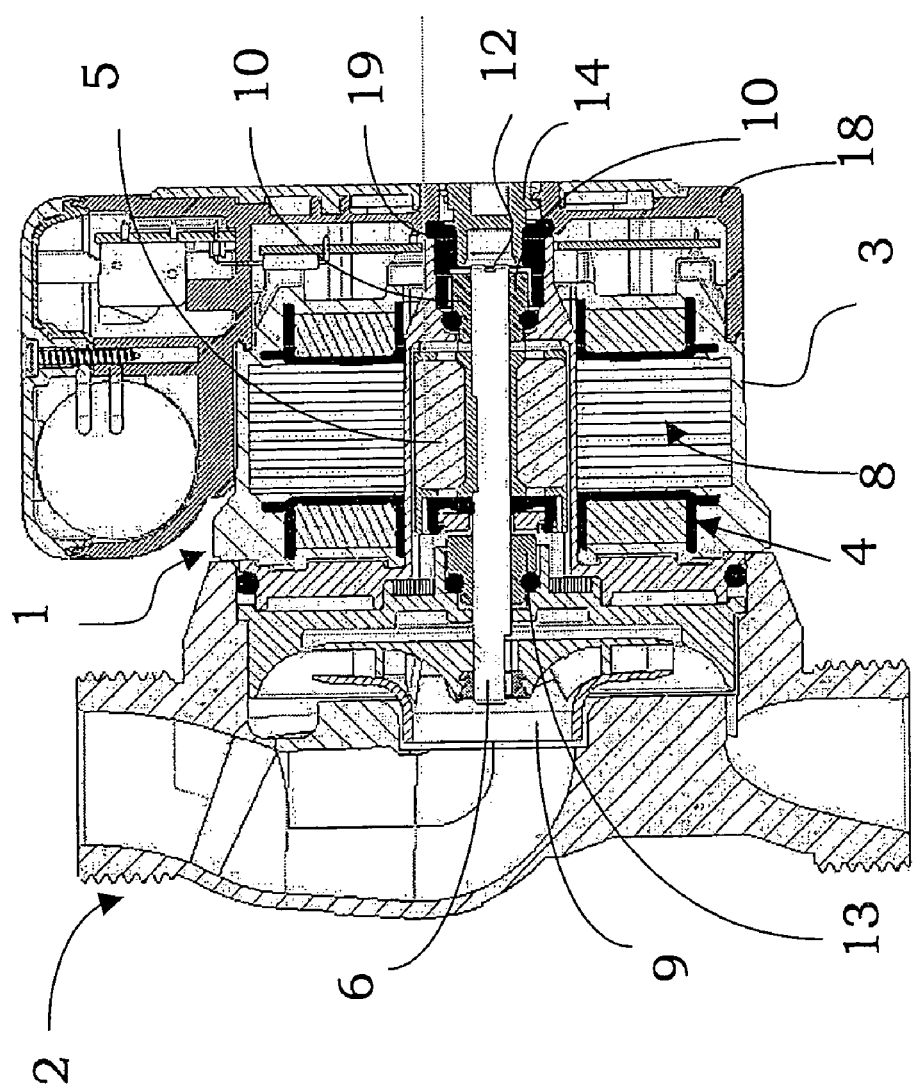
FIG. 1 is a longitudinal section view showing schematically a circulator equipped with the motor according to this invention.

With reference to the drawing, a synchronous electric motor is schematically and generally shown with 1. The motor is for a centrifugal pump 2, in particular a circulation pump for a heating/conditioning plant or system.

The motor 1 has an axis x—x and is of the permanent magnet type.

As the skilled ones in the art well know, the motor 1 is structured to drive the operating member, i.e. an impeller 9 of the pump 2.

The motor 1 is enclosed within a protective casing 3, comprising an overturned cup-shaped body and a cover 18. The motor 1 comprises a stator 4 with associated core of laminations and statoric coils.

The stator 4 conventionally comprises a plurality of packed metal laminations 11, and statoric coils arranged in cross-like configuration to form four pole shoes.

In a preferred embodiment, the stator 4 comprises a monolithic coil-supporting body 30, formed preferably with thermoplastic material and having a ring-like central portion 31, substantially in the shape of a hollow parallelepipedon having four walls 41 that define a throughgoing cavity 25, which cavity extends along the axis x—x.

The monolithic body 30 has also four arms or branches 32 that extend cross-like from the central body 31. Each arm 32 projects from a relevant wall 41 of the parallelepipedon. It should be noted that the supporting body 30 could be star-like shaped, i.e. formed as a six-arm star, where a higher number of pole shoes are required, for example six shoes.

A housing 7 for a rotor 5 of the electric motor 1 extends through the central body 31. The rotor 5 is of the permanent magnet type which is tightly isolated, with respect to the stator, by the housing 7. The housing 7 is essentially a tube 17 and is inserted for passing through the cavity of the central body 31 along the axis x—x.

The arms 32 of the body 30 are in turn hollow parallel-epipedal bodies projecting from the walls 41, they are preferably in communication with the cavity of the central body 31, and have flanges 19, 28, 29, 33 at their respective free ends.

Each flange frontally presents a pair of stiffening ribs 34, 35, which extend in parallel and crosswise along the short sides of the access opening to the cavity of each arm 32.

At least one 28 of the flanges is supplied with a pair of carvings 15 receiving an end section, previously peeled, of a conductive wire 16.

Another two flanges, 19 and 29, are formed with one carving 15 only, while only one flange 33 has no carving for reasons to be explained below.

The side dimension of each flange is equal to the width of said central portion 31. Advantageously, each arm 32 is used as a spool for a corresponding statoric coil.

Figure 6:
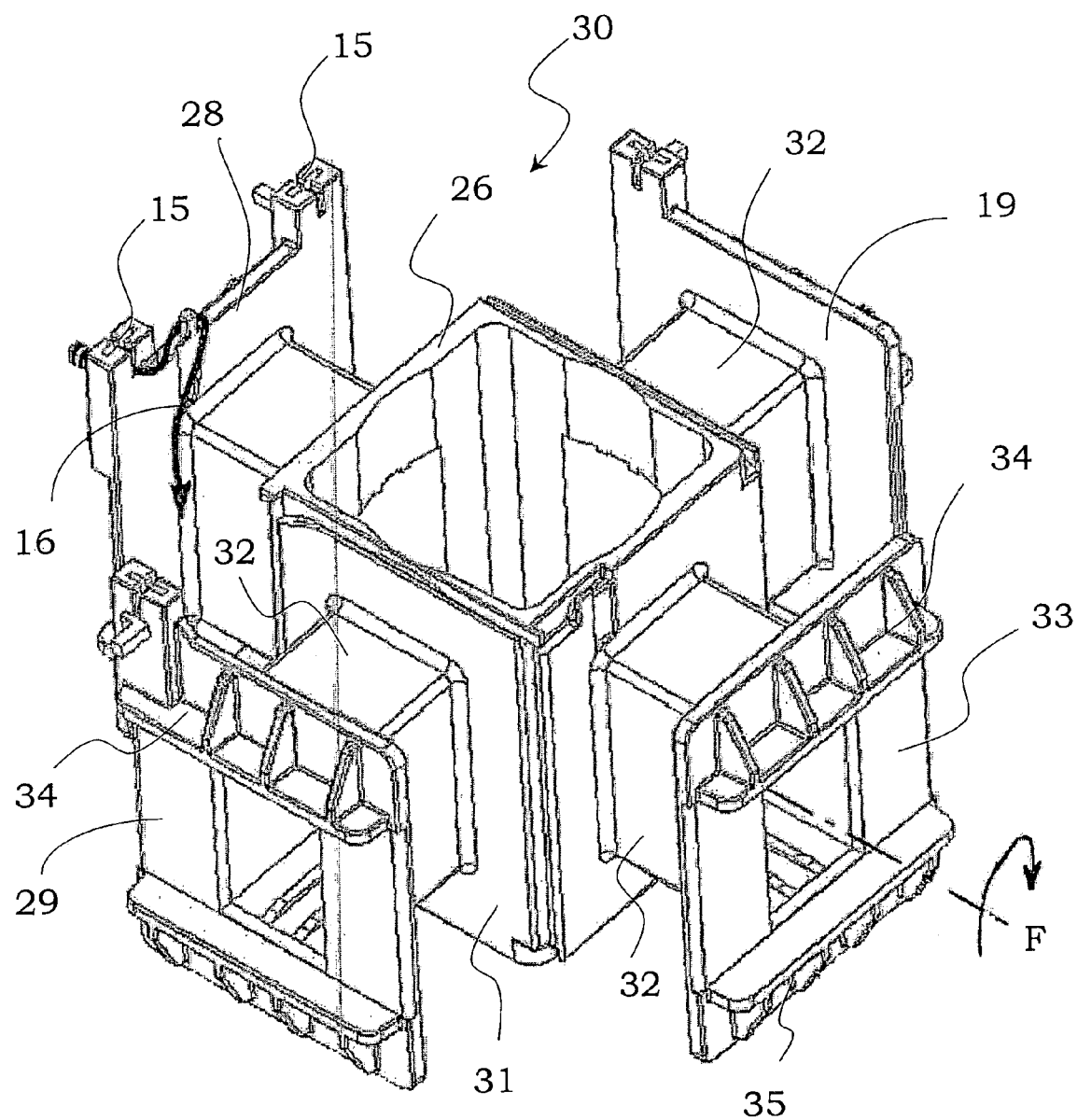
FIGS. 6 to 12 are perspective views showing schematically the same portion as in FIGS. 3-5 at different stages of the manufacturing process.

Illustrated schematically in FIG. 6 and foll. are sequential steps of the process for making the statoric coils. These steps are carried out on an automatic winder, not shown because conventional.

A first end of the wire 16 is inserted in a carving 15 of the flange having two carvings.

The monolithic body 30, arranged on a throughgoing support through the cavities of the arms 32, is rotated in the direction of the arrow F to automatically wind a first stator coil 21.

Figure 7:
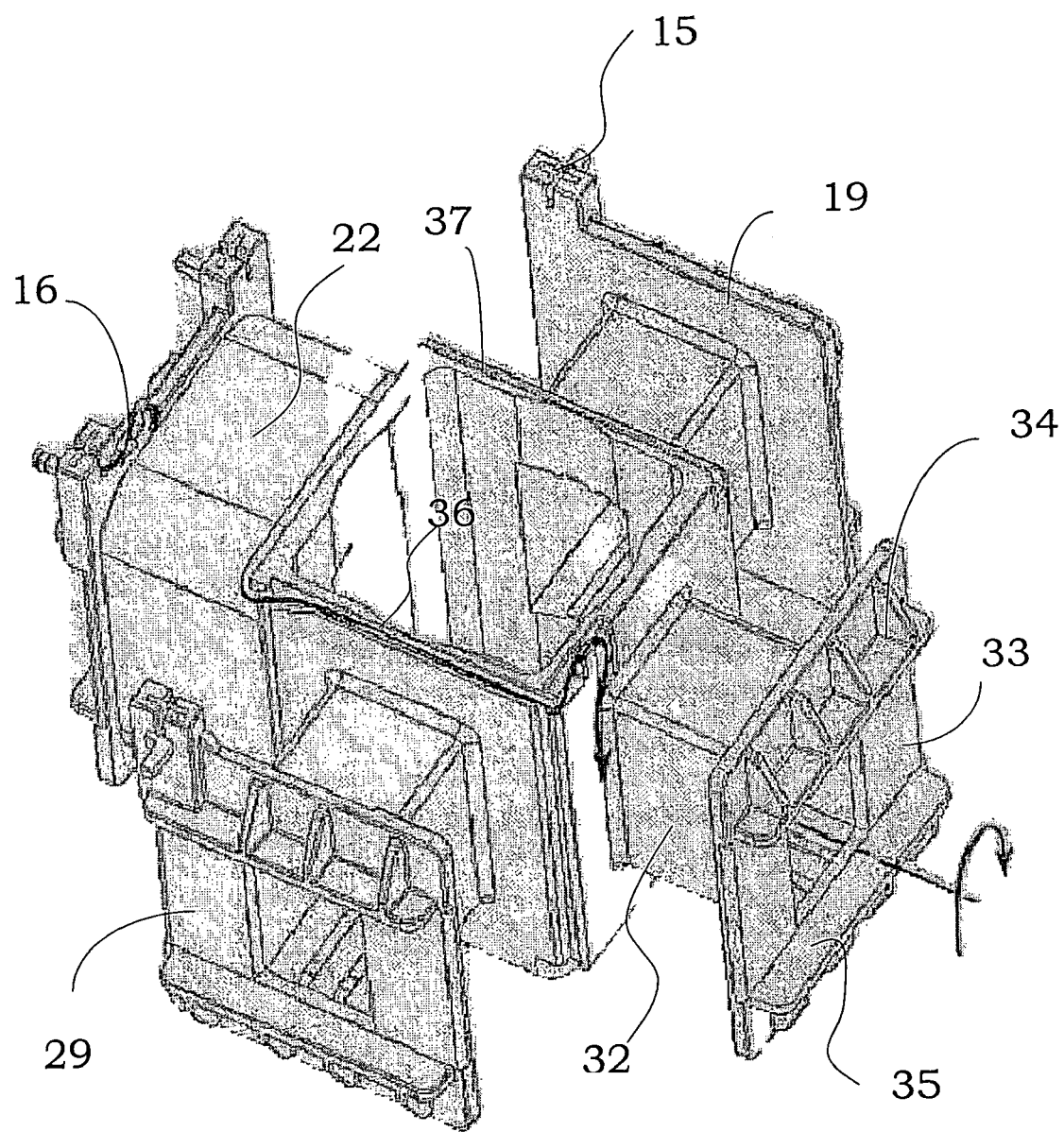

Upon completion of this step, the wire 16 will be received in a groove 36 extending parallel to one edge of the central body 31, at one of the open walls, as best shown in FIG. 7.

At this stage, the wire 16 is wound into a second statoric coil 22, located opposite from the previously formed one. The direction of rotation of the monolithic body 30 is again that of arrow F.

Figure 8:
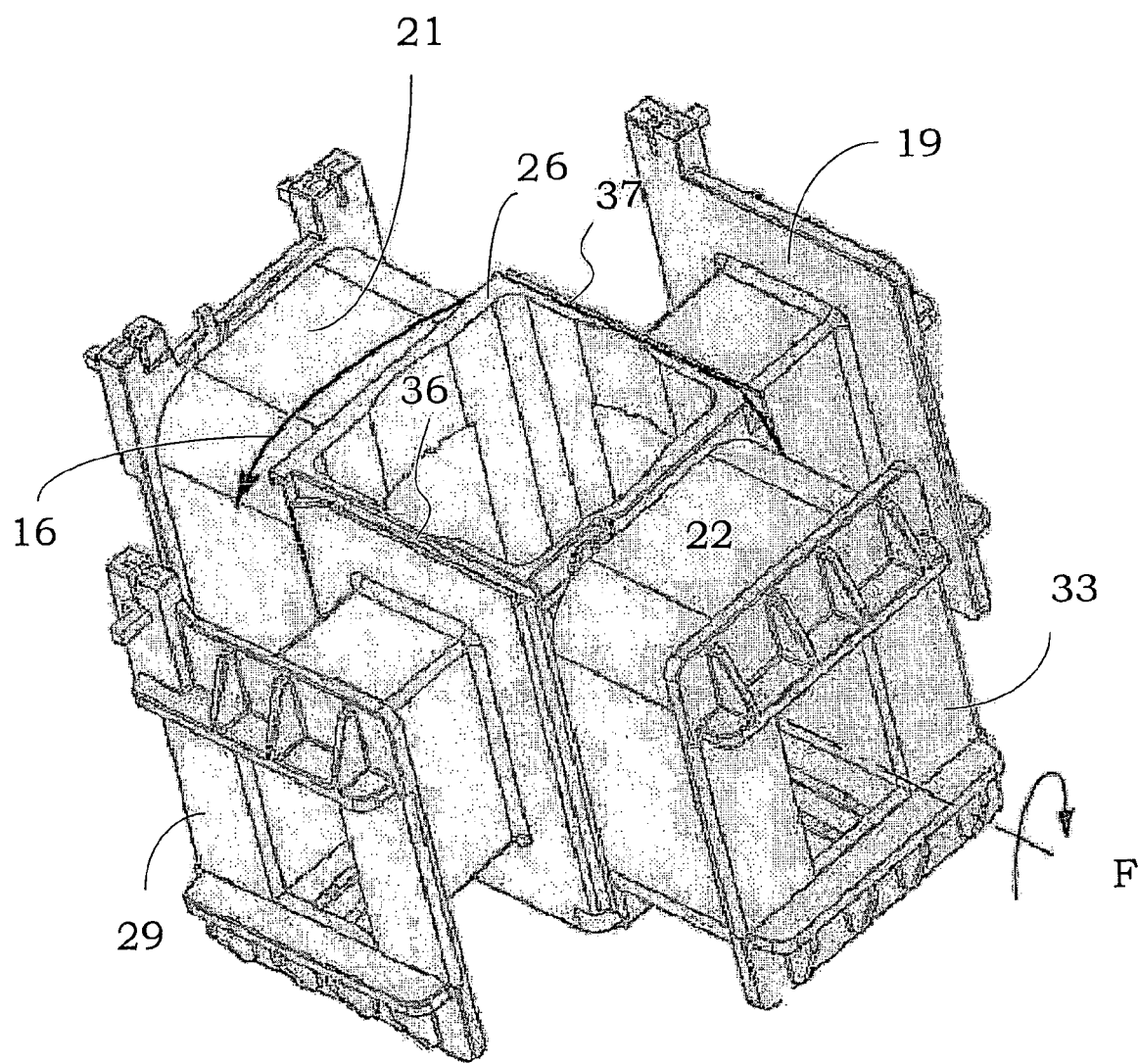
Figure 9:
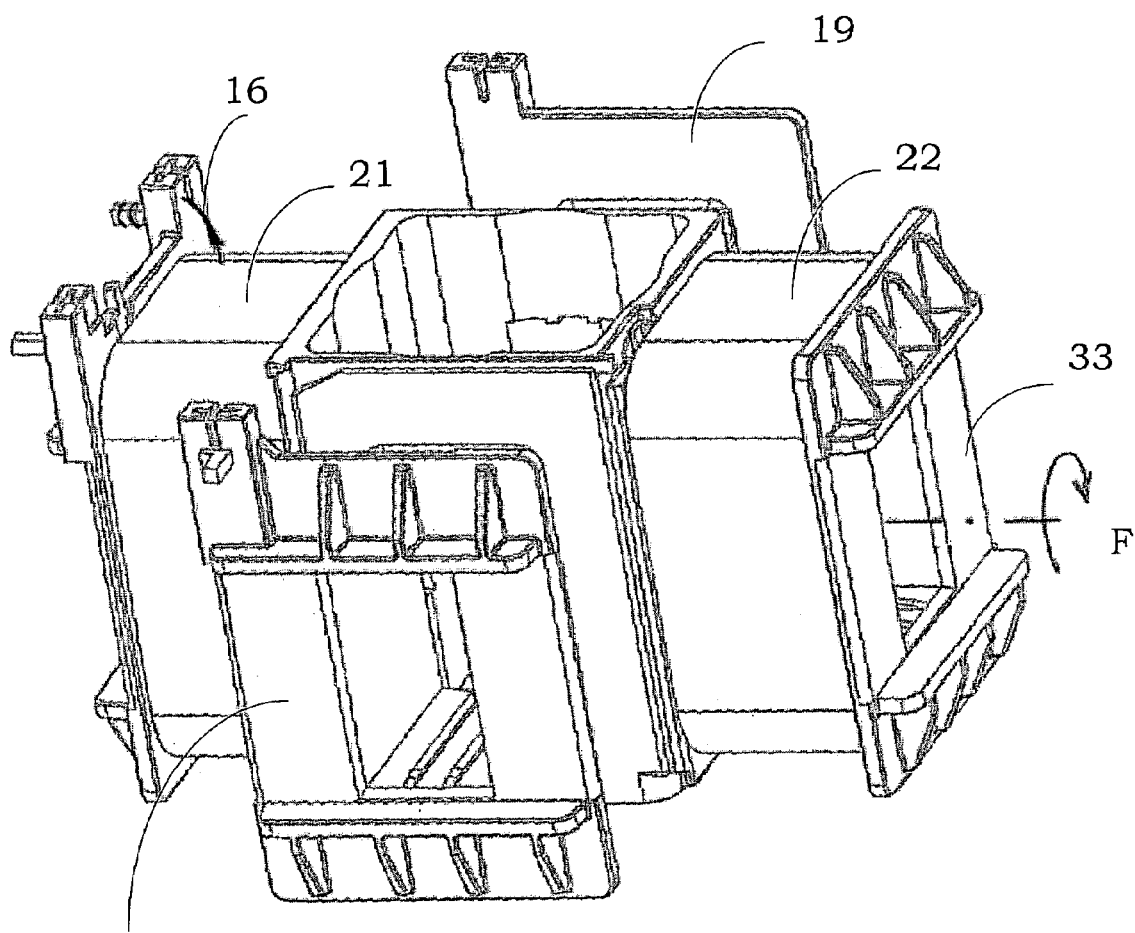

Upon completion of the second coil 22, the wire 16 is passed through a second groove 37, provided along an oppositely located edge of the central body 31, so as to reach and stay in the second carving 15 of the first flange 28, see FIGS. 8 and 9.

At this stage, the monolithic body 30 is drawn out of the support of the winder, twisted 90 degrees and returned to the same support of the winder for winding a third coil 23.

As previously explained, a first end of the wire 16 is first inserted and secured in a carving 15 of a flange 29 having a single carving.

Figure 10:
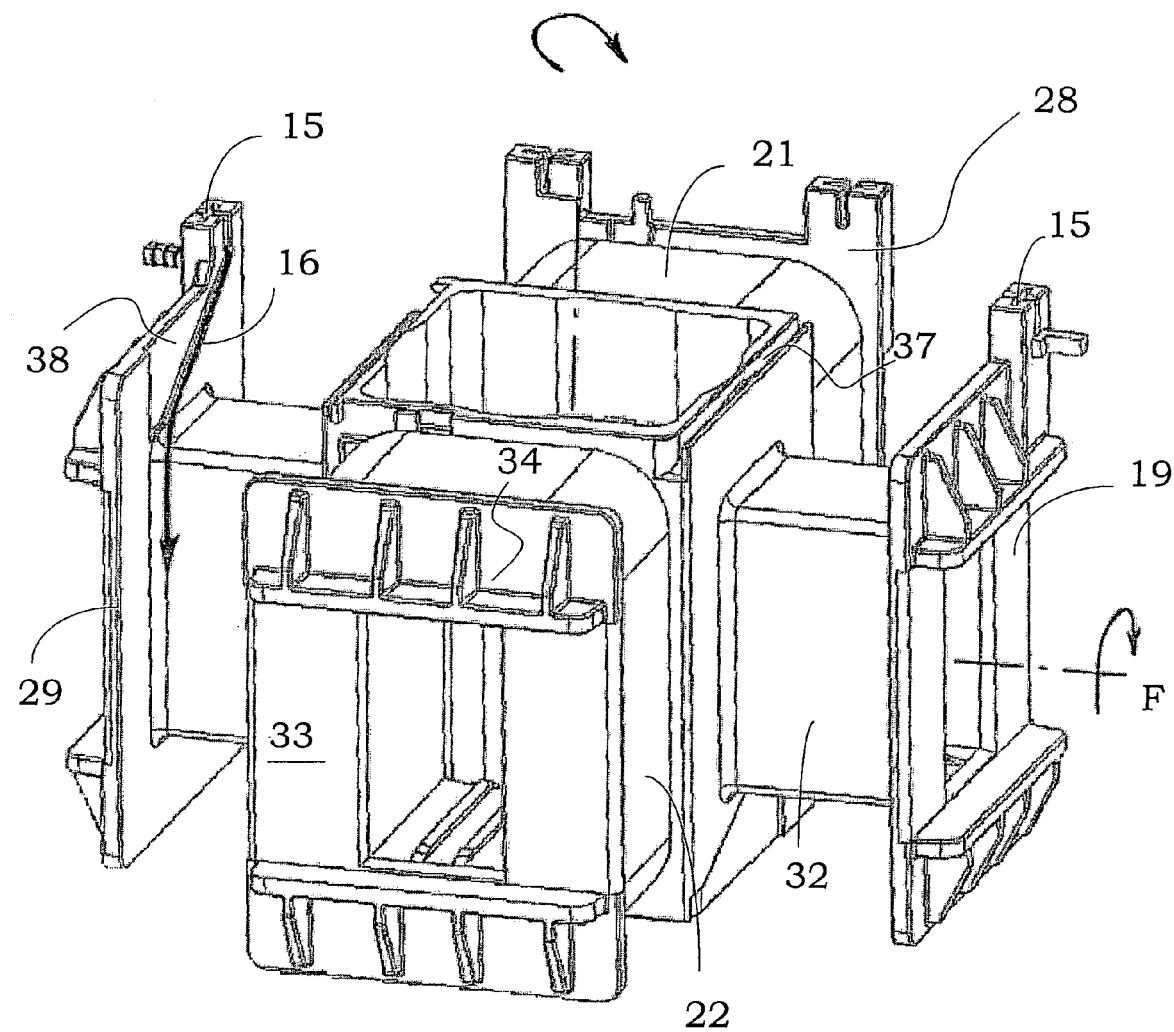

The body 30 is then rotated to wind it with a third coil 23, see FIG. 10. FIG. 10 shows a specific recess 38 inside flange 29, through which the wire 16 is led to the surface of the arm 32 where the winding starts.

Upon completion of the third coil 23, the wire 16 is mounted on a third groove 39 extending parallel to an oppositely located edge of the central body 31 from the grooves 36 and 37, i.e. on the same side of the open wall 27.

Figure 11:
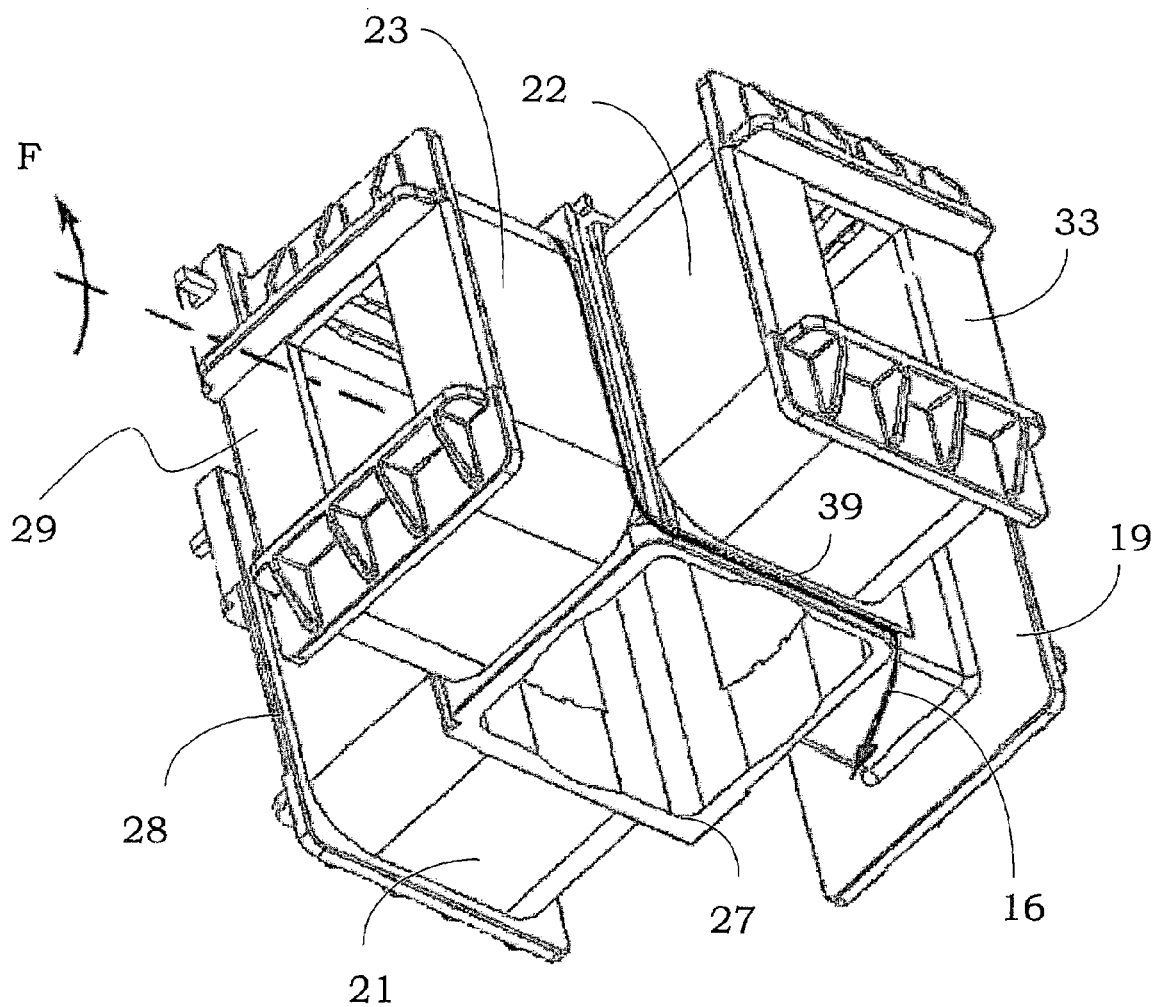
Figure 12:
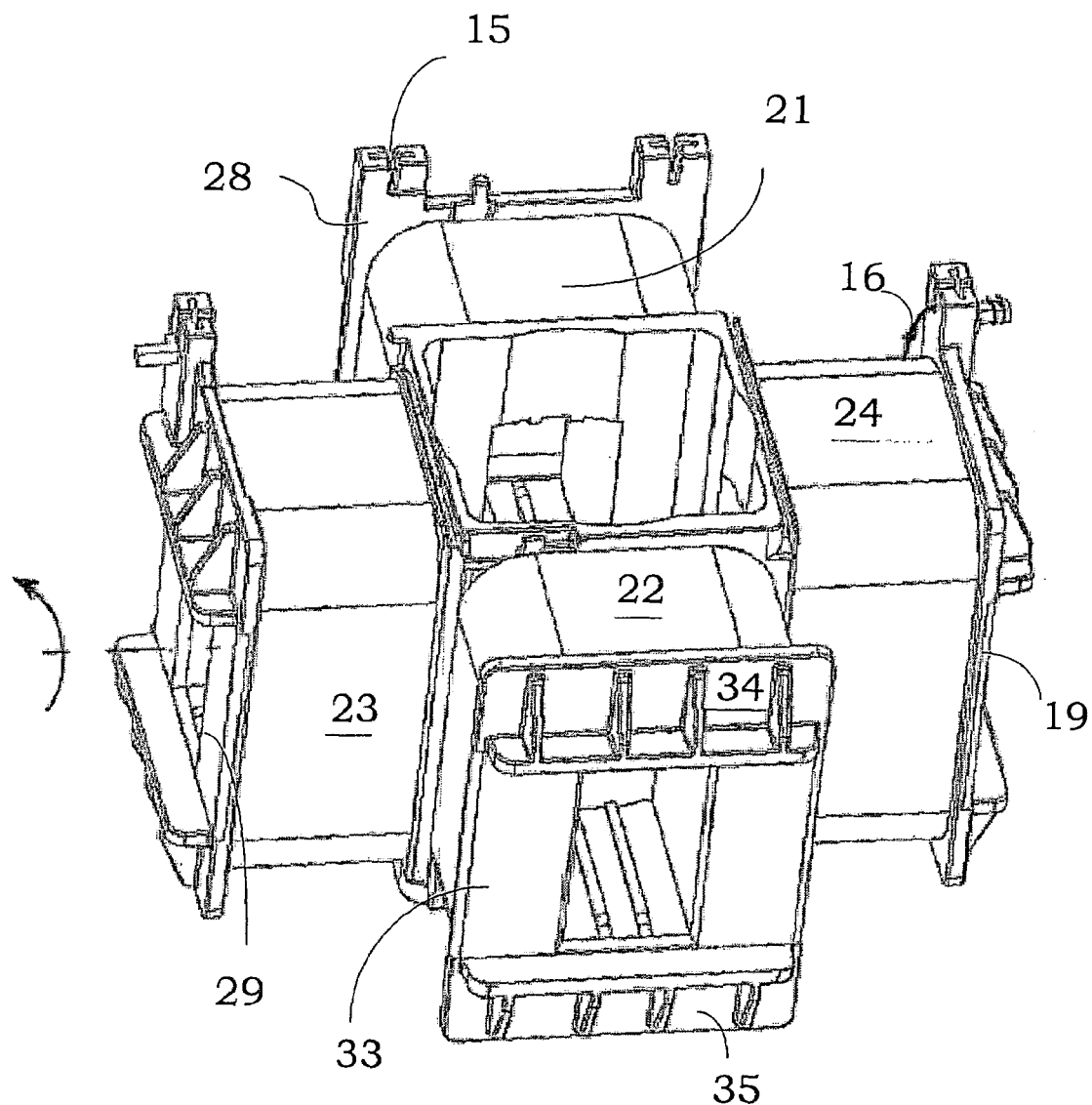
Figure 13:
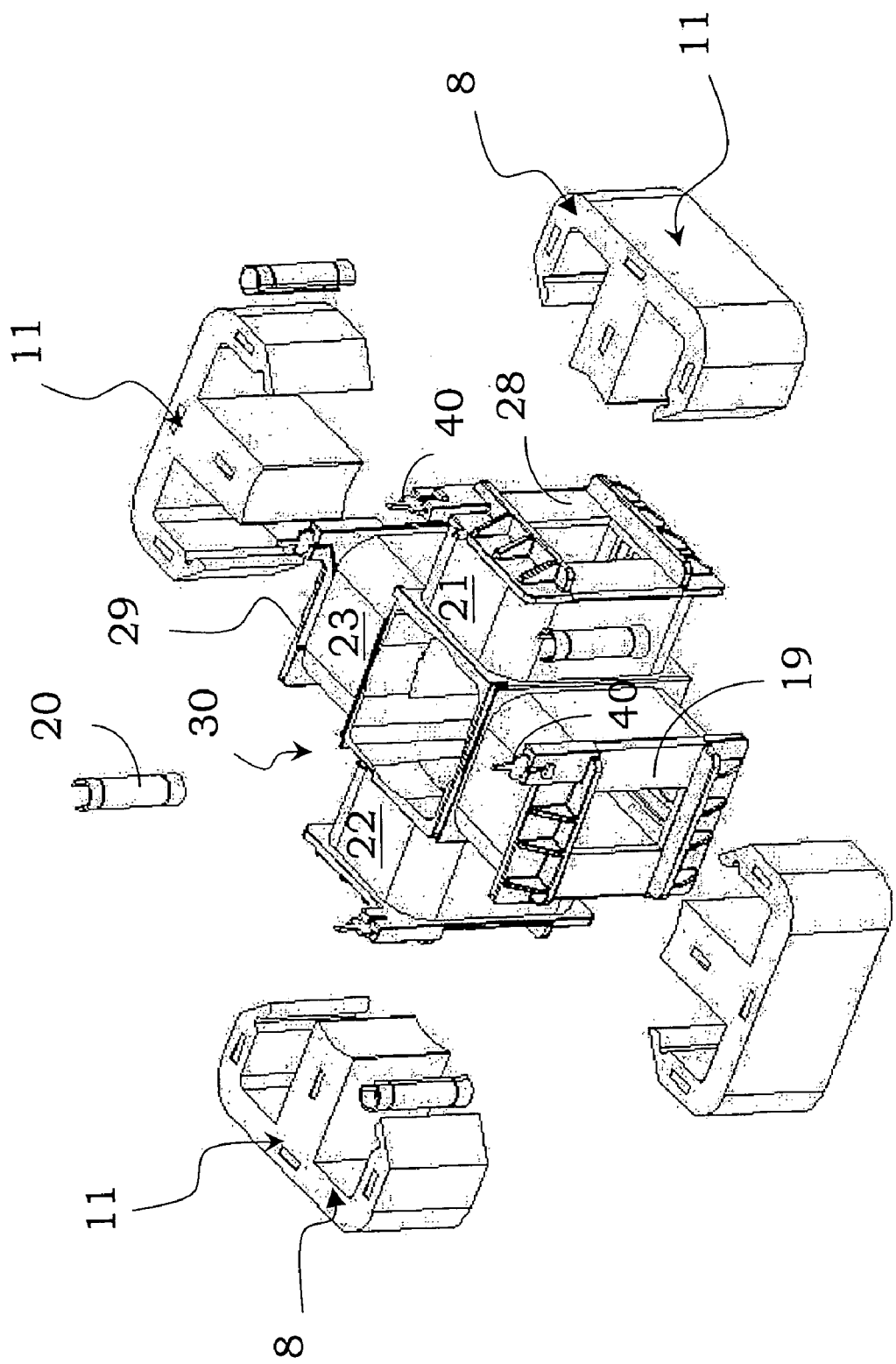
FIGS. 13 to 16 are perspective views showing schematically a second embodiment of a portion of the statoric group of this invention.
Figure 14:
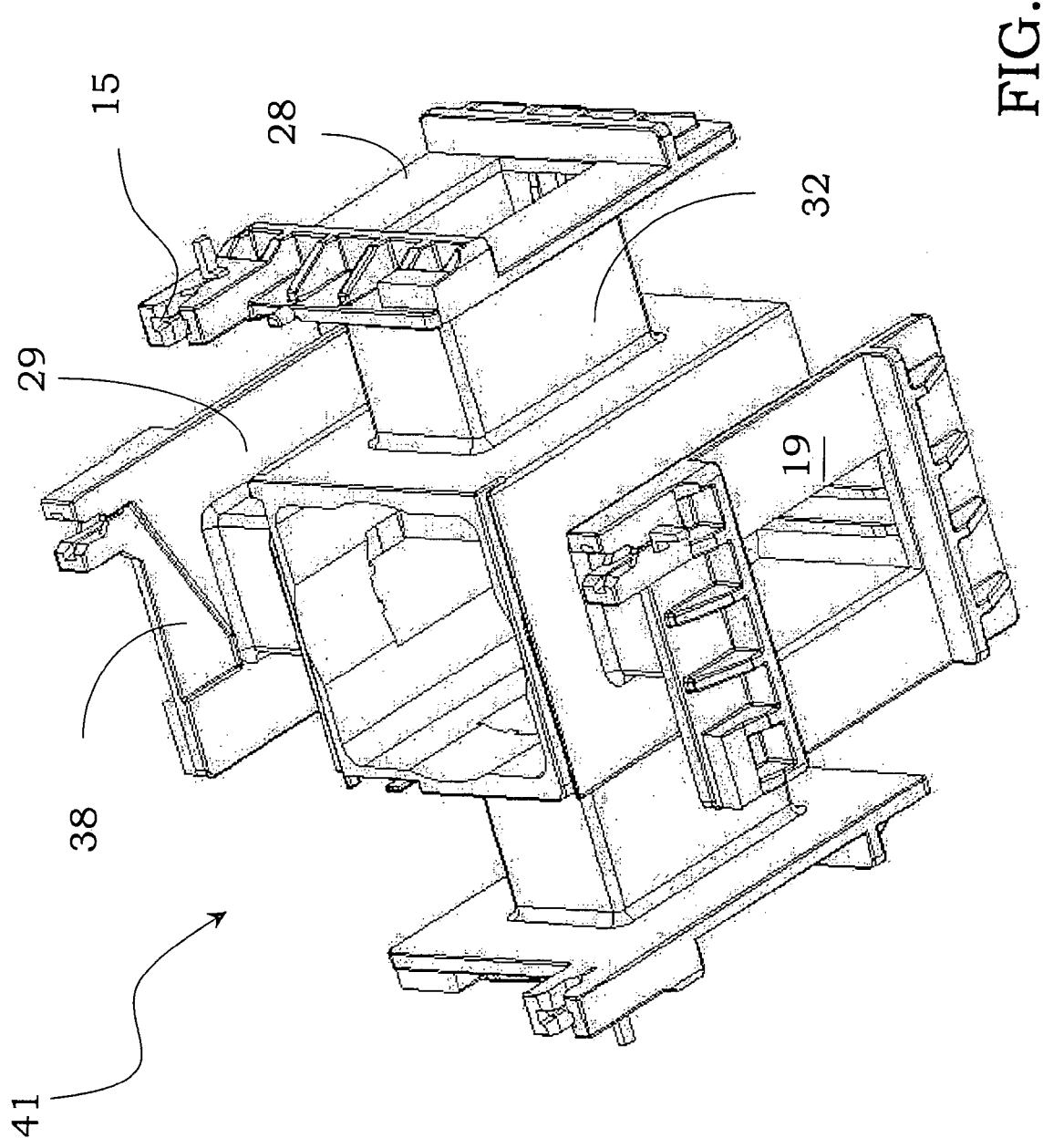
Figure 15:
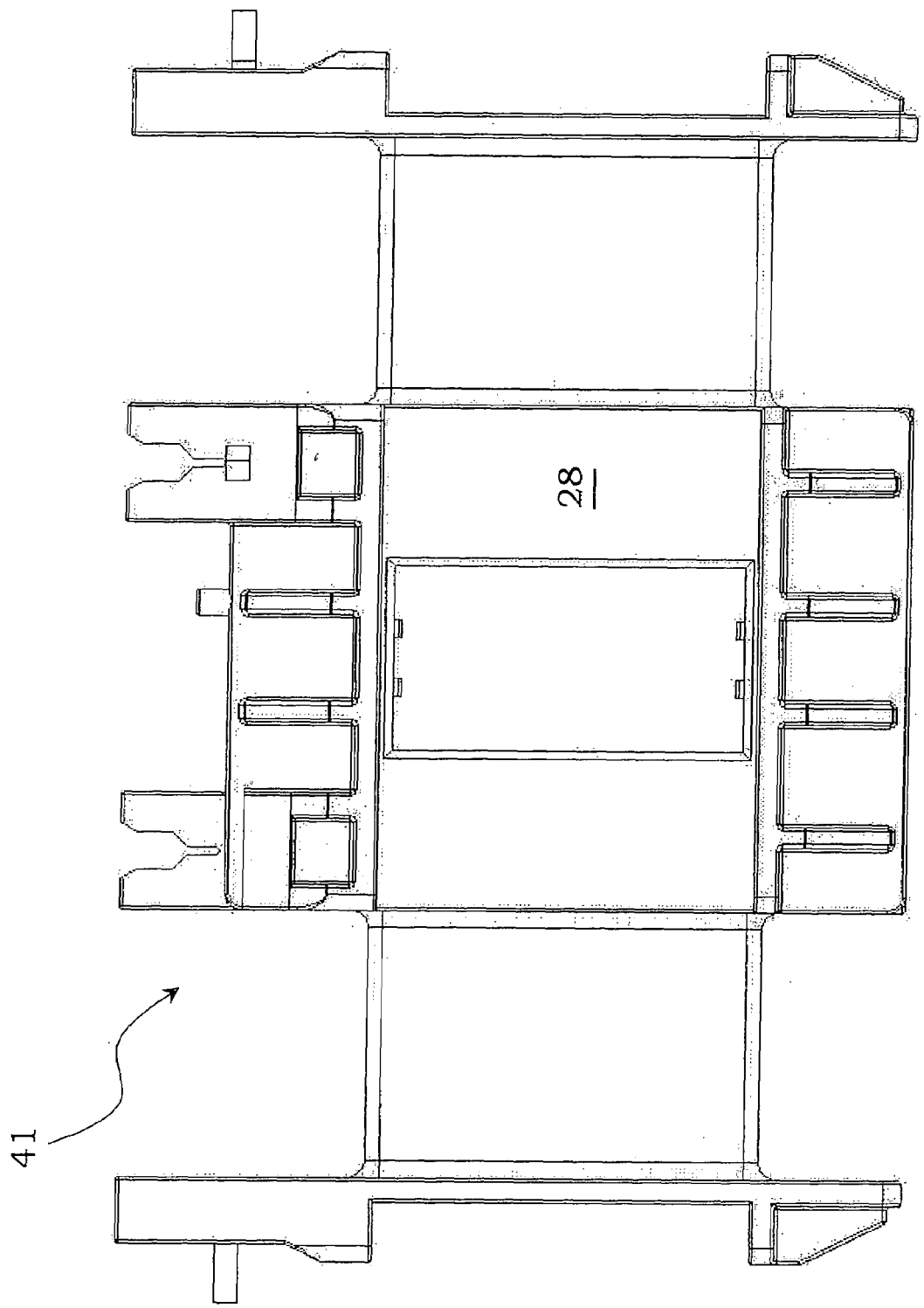
Figure 16:
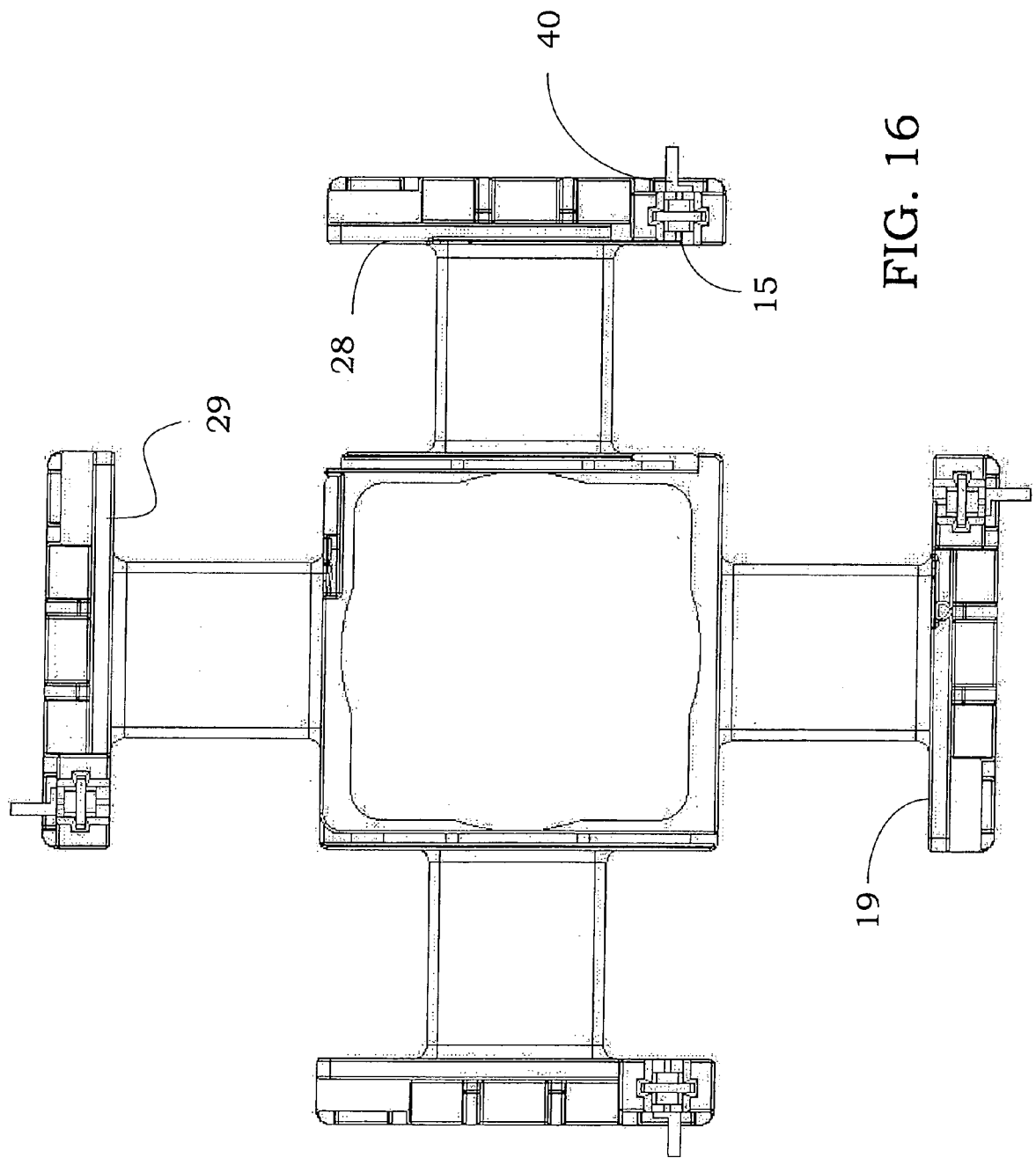

At the end of the groove 39, next to the central body 31, the fourth coil 24 is wound continuously, again by rotation in the direction of arrow F of FIG. 11. Upon completion of the coil 24 (see FIG. 12), the end section of the wire 16 will be inserted in the carving 15 of flange 19.

Advantageously, the carvings 15 in each of the flanges 19, 28, 20, 33 can be reached through an entrance opening where a fast-on socket is defined for a connecting pin 40.

The connecting pins 40, when inserted in their sockets, will be coplanar for simultaneous engagement with intakes of an electric board 25 for electric interconnection (see FIG. 1).

In a modified embodiment shown in FIGS. 13, 14, 15 and 16, the monolithic body, denoted here by the numeral 41, comprises flanges, each one provided with one carving 15 only and associated socket receiving the connector 40.

The electric board 25 is mounted in the box-like cover 18 for the bottom of the casing 3 of the motor 1.

Figure 2:
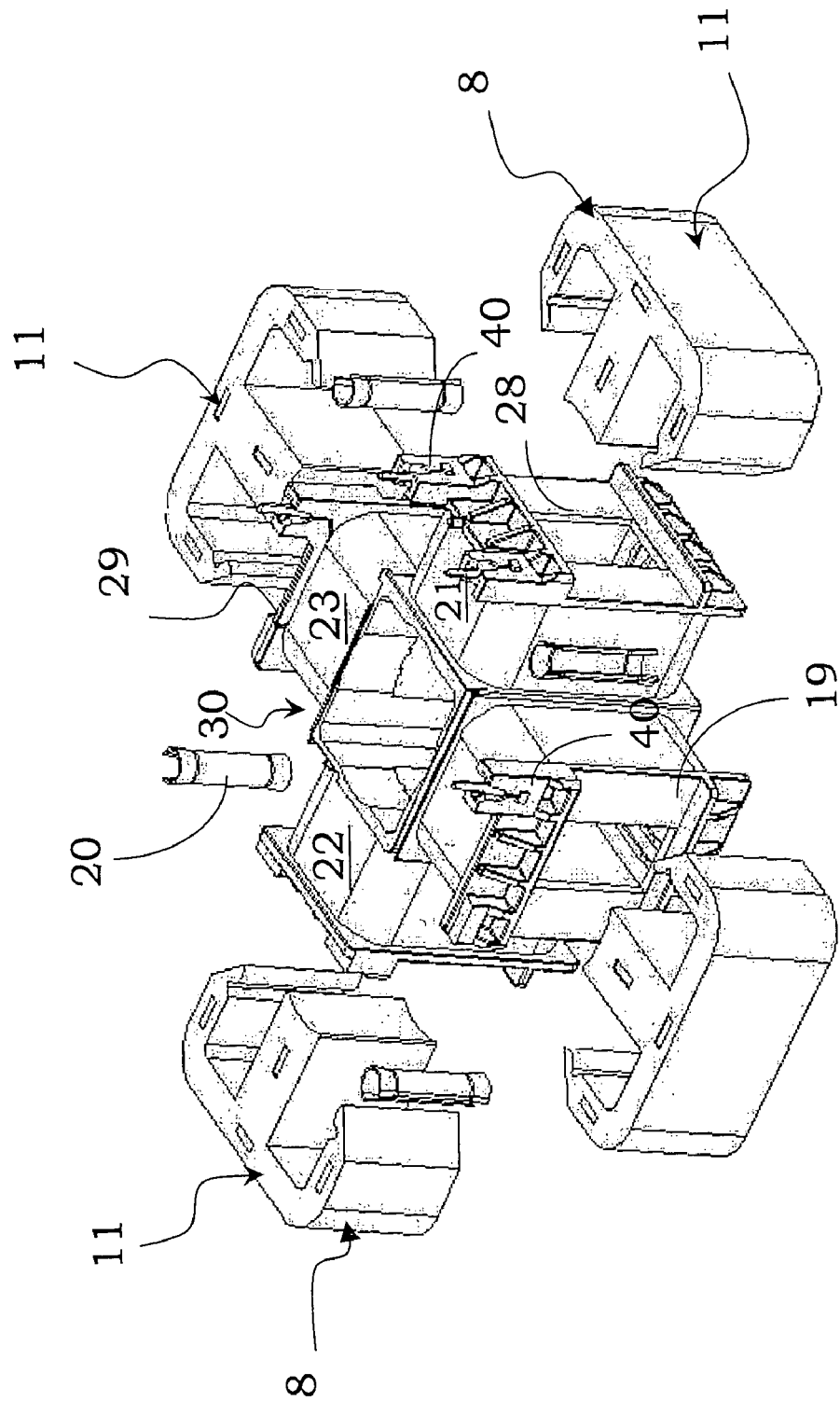
FIG. 2 is an exploded view showing schematically a statoric group according to the invention and embedded inside the motor of FIG. 1.
Figure 3:
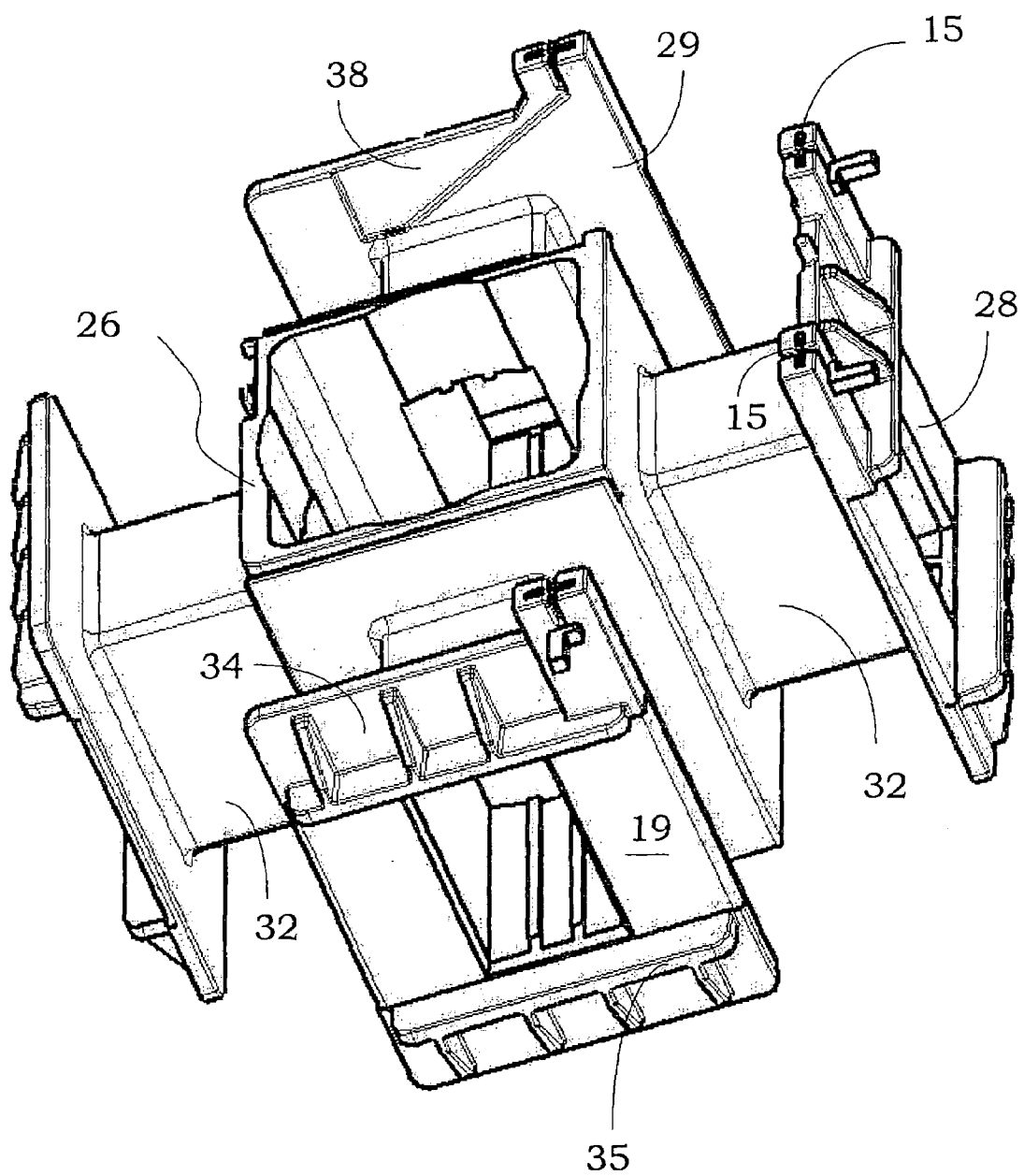
FIGS. 3, 4 and 5 are schematic perspectives, side and top views respectively, of a portion of the inventive statoric group.
Figure 4:
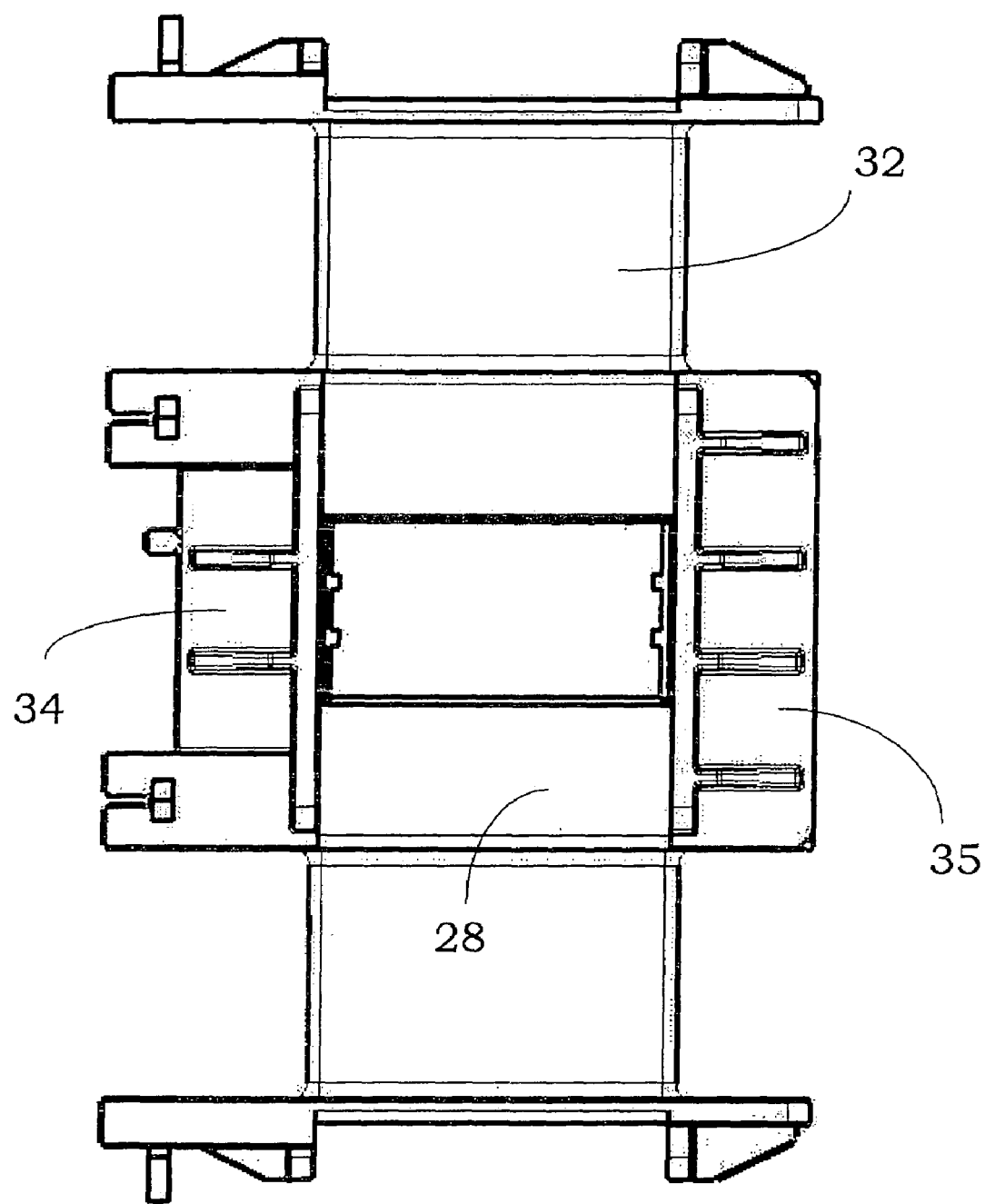
Figure 5:
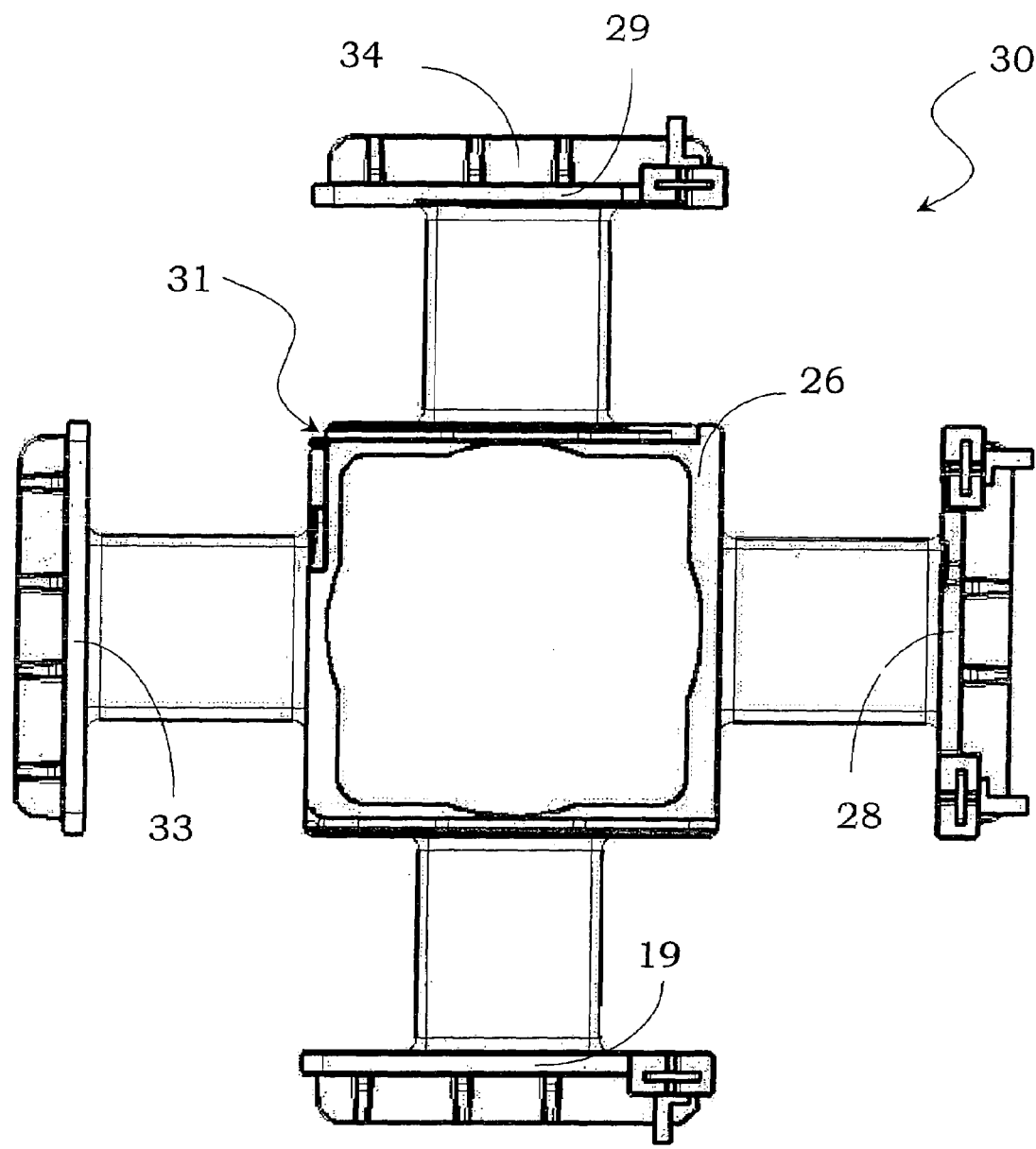

The construction of the stator 4 is then completed with the addition of the metal laminations 11, which are essentially E-shaped and packed together to form four groups 8 of pole shoes. The groups 8 are assembled with their coils by inserting the middle portion of the E-shape inside the cavity of each arm 32 (see FIG. 2).

The near ends of the groups 8 of laminations are tight together conventionally by springs 20 in the shape of a lengthwise open cylinder, as described in U.S. Pat. No. 6,452,303 to the same Applicant, for example.

From the previous description it can be appreciated that the statoric group of the motor of this invention is uniquely simple to be made with a simplified manufacturing cycle and most reliably, low-cost equipment.

The specific geometry of the coil support allows the coils to be made on simple winders arranged to wind the wire around the arms almost in the same manner as around separate spools.

The conductive wire paths from one arm to another of the monolithic body are protected, and allow the coils to be formed without danger of collision or tangle for the wire. This is also obtained thanks to the side dimension of the flanges not exceeding the width of the central body 31 of the monolithic support 30.

The coils are formed on the monolithic support 30 by keeping the wire undamaged, so that preliminary soldering is no longer needed, but the contact with the pins is guaranteed by mere mechanical cutting of the insulator (peeling) and the final soft soldering after the pins are inserted.

Furthermore, the peculiar design of the statoric group allows the stator to be assembled with pre-wound coils on a monolithic support for easier mounting of the entire statoric group.

For completeness sake, the overall construction of the motor 1, including the permanent-magnet rotor 5 mounted inside the housing 7 tightly isolated from the stator 4, will now be described.

More particularly, the rotor 5 is mounted in a tube 17 of parallelepipedal shape tapering toward one end. The tube 17 is inserted through the hollow central portion 31 supporting the coils of the stator 4, and is formed integrally with a flanged portion 13 overlying the stator 4 in a shape matching.

A shaft 6 of the motor 1 is integral with the rotor 5 and kinematically coupled with the impeller 9 of the pump 2, in a conventional way.

The shaft 6 is supported inside the tube 17 by bearing means provided at opposite shaft ends. These bearing means comprise a first bush 10 rotatory engaged by one end 12 of the shaft 6 adjacent to the tapered end of the tube 17.

A second bush is mounted at the junction of the tube 17 and the flanged portion 13, and is rotatory engaged by an end section of the shaft 6 before coupling with the impeller 9.

Ring seals are mounted between each bush 10, 13 and the housing 7. The bushes 10, 13 may be of graphite or thermoplastic material.

Advantageously in this invention, a sleeve piece 19 is keyed onto the first bush 10 and fixedly inserted in the tapered end 19 of the tube 17.

The sleeve piece 19 is of elastomer or thermoplastics material and adapted to withstand high working fluid temperatures, up to 110° C. or more.

The motor 1 further includes a cap 14, which has a first portion removably inserted into the sleeve piece 19, and has a second portion screwly engaged in a threaded seat of a cover 18 mounted on the bottom of the casing 3.

The first portion of the cap 21 is forcedly inserted into the sleeve piece 19 to expand it and to press it tightly between the cap 14 and the end of the tube 17.

Similarly to the sleeve piece 19, the cap 14 may also be of elastomer or thermoplastic material.

Advantageously, the cover 18 is essentially box-shaped to seal off electric driving circuits and/or components of the motor 1. The cover 18 may be, for example, of the kind disclosed in the Italian Patent Application No. PD2001A000277 by the same Applicant.

The motor of this invention has the important advantage of being particularly simple structured and fast to be assembled, avoiding any possible mistake.

As another advantage a long maintenance-free operating life is to be expected.

Finally, the reduced number of connections results in simple, reliable assembling and improved overall performance.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A permanent-magnet synchronous electric motor for circulation pumps of heating and/or conditioning systems, comprising:
    a motor casing;
    a stator inside said casing and having statoric core of laminations and statoric coils wound on respective spools; and
    a monolithic body having substantially cross or star-like arms extending from a central portion, said central portion having grooves between pairs of juxtaposed arms for routing a wire from one coil to another, said arms being said spools.

2. An electric motor according to claim 1, wherein carvings are provided in each spool to receive an ending section of a wire, previously peeled, of the respective coil.

3. An electric motor according to claim 2, wherein recessed sockets are provided for respective connecting pins associated with a respective carving to be connected to said ending section of the wire.

4. An electric motor according to claim 3, wherein said connecting pins are coplanar for simultaneous engagement with intakes on a electric board for electric interconnection, mounted in a cover of the casing.

5. An electric motor according to claim 4, wherein said arms have respective free ends formed with a flange; and that the side dimension of each flange is equal to the width of said central portion.

6. An electric motor according to claim 2, wherein the central portion of the monolithic body has a ring-like shape, essentially in the form of a hollow parallelepipedon with four walls defining a throughgoing cavity; and that said arms extend from said central portion, each one projecting from a corresponding wall.

7. An electric motor according to claim 6, wherein a recess is provided inside at least one flange to receive the first section of said wire after its insertion in a relevant carving.

8. An electric motor according to claim 6, wherein at least one flange is formed with at least a pair of said carvings.

9. An electric motor according to claim 6, wherein arms are hollow to receive the statoric core of laminations and in communication with said throughgoing cavity.

10. A permanent-magnet synchronous electric motor for circulation pumps of heating and/or conditioning systems, comprising:
    a motor casing;
    a monolithic body inside said motor casing having a plurality of cross or star-like arms extending from a central portion;
    wherein the plurality of arms in said cross-like or star-like monolithic body form the spools of a stator;
    wherein said stator has a statoric core of laminations and statoric coils wound on respective spools; and
    wherein the central portion has grooves between pairs of juxtaposed arms for routing a wire from one coil to another.

11. An electric motor according to claim 10, wherein carvings are provided in each spool to receive a peeled ending section of a wire of the respective coil.

12. An electric motor according to claim 11, wherein recessed sockets are provided in each spool for respective connecting pins associated with a respective carving to be connected to said ending section of the wire.

13. An electric motor according to claim 12, wherein said connecting pins are coplanar for simultaneous engagement with intakes on a electric board for electric interconnection, mounted in a cover of the casing.

14. An electric motor according to claim 13, wherein said arms have respective free ends integrally formed with a flange; and that the side dimension of each flange is equal to the width of said central portion.

15. An electric motor according to claim 11, wherein the central portion of the monolithic body has a ring-like shape, essentially in the form of a parallelepipedic hollow with four walls defining a throughgoing cavity; and that said arms extend from said central portion, each one projecting from a corresponding wall.

16. An electric motor according to claim 15, wherein a recess is provided inside at least one flange to receive the first section of said wire after its insertion in a relevant carving.

17. An electric motor according to claim 15, wherein at least one flange is formed with at least a pair of said carvings.

18. An electric motor according to claim 15, wherein said arms are hollow to receive the statoric core of laminations and in communication with said throughgoing cavity.

* * * * *